US008393237B2

(12) United States Patent
Arenz et al.

(10) Patent No.: US 8,393,237 B2
(45) Date of Patent: Mar. 12, 2013

(54) DRIVING DEVICE FOR A HATCH IN A MOTOR VEHICLE

(75) Inventors: Bernd Arenz, Herschbroich (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 1071 days.

(21) Appl. No.: 12/366,698

(22) Filed: Feb. 6, 2009

(65) Prior Publication Data

US 2009/0199482 A1 Aug. 13, 2009

(30) Foreign Application Priority Data

Feb. 7, 2008 (DE) ......................... 10 2008 008 294

(51) Int. Cl.
*F16H 25/20* (2006.01)

(52) U.S. Cl. ...................................................... 74/89.23

(58) Field of Classification Search ........... 74/89, 89.23, 74/89.38; 464/30, 44, 89, 169
See application file for complete search history.

(56) References Cited

U.S. PATENT DOCUMENTS 2,387,800 A * 10/1945 Leland et al. .................. 318/14
2002/0066325 A1 * 6/2002 Roither et al. ............... 74/89.23
2007/0062119 A1 * 3/2007 Ritter .............................. 49/343

* cited by examiner

*Primary Examiner* — Phillip A Johnson
(74) *Attorney, Agent, or Firm* — Cozen O'Connor

(57) ABSTRACT

A driving device for a hatch in a motor vehicle includes a first fastening element which can be connected to a stationary structural component, a second fastening element which can be connected to a movable structural component, and a housing tube fixed to the second fastening element and extending toward the first fastening element. A spindle drive includes a threaded spindle and a nut fixed in a spindle tube connected to the first fastening element by a bolt, wherein the spindle can be driven in rotation to move the first fastening element axially relative to the housing tube. An elastomeric decoupling element between the spindle tube and the bolt decouples the spindle drive from the first fastening element in order to damp noise and vibration.

17 Claims, 2 Drawing Sheets

DRIVING DEVICE FOR A HATCH IN A MOTOR VEHICLE

BACKGROUND OF THE INVENTION

1. Field of the Invention

The invention is directed to a driving device, particularly for a hatch in a motor vehicle, with a spindle drive.

A device of this type includes a first fastening element which can be connected to a stationary structural component part or to a movable structural component part, and a housing tube which is axially movable relative to the first fastening element and which has, at its end located opposite to the first fastening element, a second fastening element which can be fastened to the movable structural component part or to the stationary structural component part. A spindle drive has a threaded spindle and a spindle nut arranged on the threaded spindle by which the first fastening element and the housing tube are drivable so as to be movable axially relative to one another, wherein the spindle drive is drivable in rotation by a rotary drive.

During operation of driving devices of this type, vibrations are commonly transmitted to the structural component parts which are movable relative to one another, for example, the hatch and the body of a motor vehicle, and accordingly cause unwanted noise.

SUMMARY OF THE INVENTION

It is an object of the invention to provide a driving device of the type mentioned above which is constructed in a simple manner, can be assembled in a simple manner and overcomes the above-mentioned disadvantages.

This object is met according to the invention by decoupling the spindle drive from the first fastening element by at least one decoupling element so as to dampen noise and/or vibrations.

In an advantageous construction, the spindle nut is connected to one end of a spindle tube which encloses the threaded spindle coaxially, its other end being connected to a shank of a bolt by a first elastomeric decoupling element.

The first decoupling element is arranged between the spindle tube and the shank of the bolt inside the spindle tube.

In order to facilitate assembly, the first decoupling element is vulcanized on the shaft of the bolt.

Alternatively, the first decoupling element can be constructed as a sleeve which is slid over the bolt.

In order to connect the spindle tube to the bolt by the first decoupling element, the shank has, at its outer surface, a plurality of circumferential grooves, and circumferential beads are formed inside the spindle tube and extend toward the grooves.

In a further development, the shank has a first collar at the end facing the threaded spindle and a second collar at the end facing the first fastening element.

Further, the bolt has a threaded pin which adjoins the shank and on which the first fastening element is screwed.

In order to achieve a simple construction, a supporting ring is fixed on the bolt with the first fastening element, the outer tube being supported at the supporting ring by its inwardly shaped end.

A second elastomeric decoupling element is arranged between the inwardly shaped end of the outer tube and the supporting disk so that the outer tube and the first fastening element are decoupled with respect to noise and/or vibration.

In a further construction, the second decoupling element is constructed as a separate ring disk.

Alternatively, the second decoupling element can be vulcanized on the supporting disk so as to facilitate assembly.

The threaded bolt advantageously extends coaxially through an opening of the outer tube, an opening in the second decoupling element, and a bore hole in the supporting disk.

In an advantageous construction, the end of the spindle tube has an inwardly directed flange. The flange and the second collar are axially spaced from one another in normal operation. Accordingly, in case of incorrect use, the flange can serve as a stop for the second collar of the bolt after a deformation path which is defined by the axial space has been realized in axial direction by the first decoupling element.

In an alternative construction, the opening in the outer tube and the opening in the second decoupling element have an inner diameter that is larger than the outer diameter of the spindle tube.

In case of incorrect use, the flange of the spindle tube serves as a stop for the supporting disk after a deformation path which is defined by the axial space has been realized in axial direction by the first decoupling element.

A third elastomeric decoupling element is arranged at a threaded bolt extending substantially coaxially through the closed end of the housing tube so that the drivetrain is completely decoupled from the hatch or body with respect to noise and/or vibration.

In an alternative embodiment form, the third decoupling element is arranged or formed at a spherical pin to which the second fastening element is connected.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
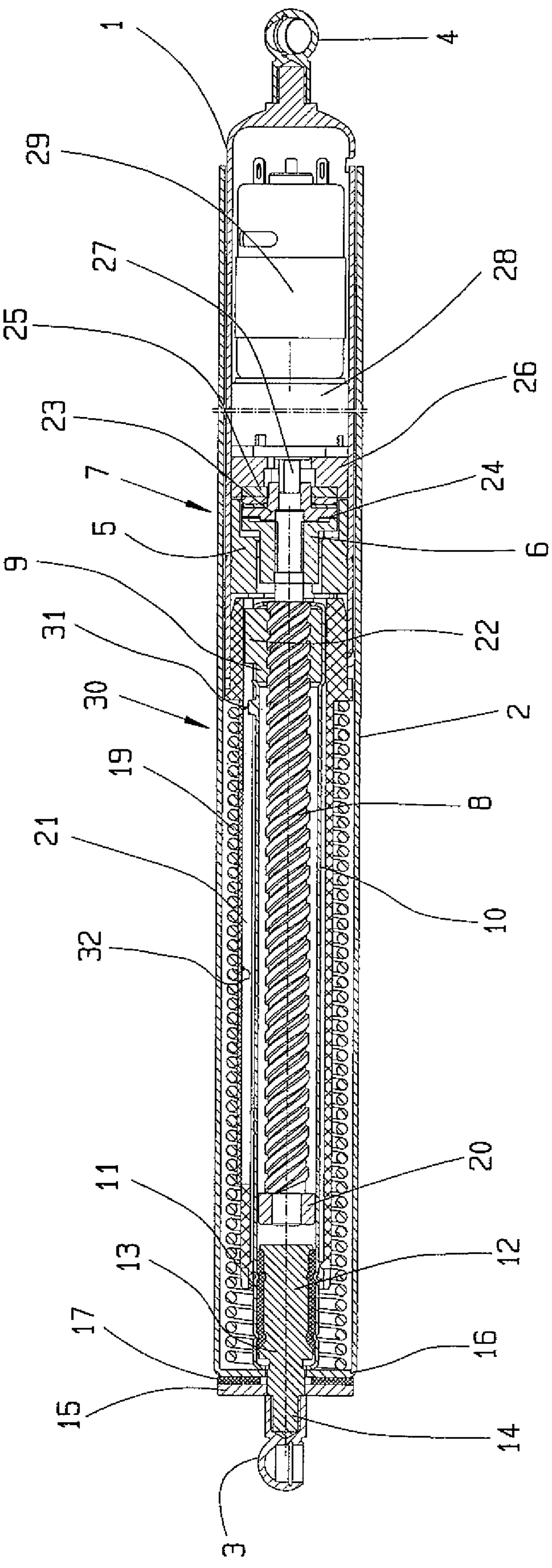
FIG. 1 shows a cross section of an embodiment example of a driving device.

The driving device shown in the drawings has a housing tube 1 at which an outer tube 2 is guided so as to be displaceable in a telescoping manner. A first fastening element 3 is arranged at the end of the outer tube 2 opposite to the housing tube 1 and a second fastening element 4 is arranged at the end of the housing tube 1 opposite to the outer tube 2. By means of these fastening elements 3, 4, the driving device can be connected in an articulated manner to a stationary structural component part of the body of a motor vehicle and to a movable structural component part of the motor vehicle constructed as a hatch. In the present embodiment example, the two fastening elements 3 and 4 are constructed as ball sockets.

A first bearing part 5 is fixedly inserted into the end region of the housing tube 1 facing the outer tube 2, a first coupling part 6 of a frictionally engaging coupling 7 being rotatably mounted in this first bearing part 5, which first coupling part 6 is fixedly fitted to one end of a threaded spindle 8 projecting into the outer tube 2.

A spindle nut 9 is arranged on the threaded spindle 8 so as to be fixed with respect to rotation relative to the housing tube 1. The spindle nut 9 is connected to one end of a spindle tube 10 which encloses the threaded spindle 8 coaxially. The end of the spindle tube 10 opposite to the spindle nut 9 is connected to a shank 12 of a bolt 13 by a first decoupling element 11. The bolt 13 has a threaded pin 14 which adjoins the shank 12 and on which the first fastening element 3 is screwed. A supporting ring 15 is fixed on the bolt 13 by the first fastening element 3, and the outer tube 2 is supported at the supporting ring 15 by its inwardly shaped end 16. A second decoupling element 17 which is constructed as a separate ring disk or is vulcanized on the supporting ring 15 is arranged between the inwardly shaped end 16 and the outer tube 2. The bolt 13 extends coaxially through an opening 2*a* of the outer tube 2, through an opening 17*a* of the second decoupling element 17, and through a bore hole 15*a* of the supporting ring 15.

The spindle nut 9 is guided so as to be axially displaceable in a guide tube 18 which encloses the spindle tube 10 and which is fixedly connected to the housing tube 1.

A helical compression spring 19 is arranged in the annular gap between the guide tube 18 and the outer tube 2 which encloses the latter at a distance therefrom. The helical compression spring 19 is supported by one end at the outer tube 2 in the region of the first fastening element 3 and by its other end at the housing tube 1.

The threaded spindle 8 carries a guide sleeve 20 at its end remote of the first coupling part 6, the threaded spindle 8 being guided by the circumferential outer surface of the guide sleeve 20 so as to be axially displaceable in the spindle tube 10.

The guide tube 18 has three axial slots 21 which are uniformly distributed along the circumference and which extend substantially along its length. Radially projecting supporting pins 22 provided on the spindle nut 9 engage in the axial slots 21 to prevent the spindle nut 9 from rotating relative to the guide tube 18.

A second coupling part 23 is arranged coaxially in the housing tube 1 opposite to the first coupling part 6. An annular friction lining 24 is located between the two coupling parts 6 and 23.

By means of an axial bearing 25, the second coupling part 23 is axially supported by its side remote of the first coupling part 6 at an abutment part 26 which is fixedly arranged in the housing tube 1. The movement play between the first coupling part 6 and the second coupling part 23 is such that they can move away from one another axially so as to release a frictionally engaging connection.

A driven shaft 27 of a gear unit 28, particularly a multistage gear unit 28, is connected coaxially to the second coupling part 23 so as to be fixed against rotation relative to it. The gear unit 28 can be driven rotatably by an electric motor 29.

The embodiment example shown herein has a lift detection sensor constructed as a linear potentiometer 30.

In this connection, a wiper 31 provided on the spindle tube 10 close to the spindle nut 9, projects through one of the axial slots 21 and is movable with the spindle nut 9 and the spindle tube 10 along a wiper path 32 extending along the axial slot 21 at its outer side.

However, alternative embodiment forms of sensor devices, e.g., Hall sensors, for acquiring the move-out speed, the rotating speed or the current position of parts of the driving device can also be integrated in the driving device.

Figure 2:
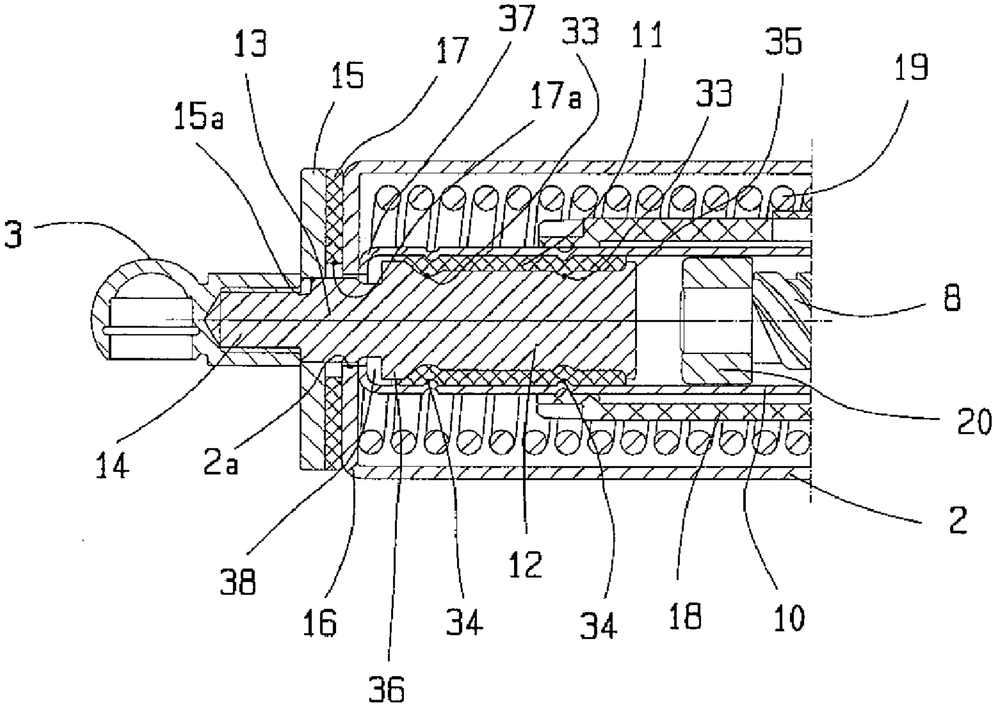
FIG. 2 shows an enlarged section through the driving device according to FIG. 1.

FIG. 2 shows a detailed view of the region of the driving device near the fastening element 3. The first decoupling element 11 is arranged between the spindle tube 10 and the shank 12 of the bolt 13 located inside the spindle tube 10. The shank 12 has a plurality of circumferential grooves 33 at its outer surface. Circumferential beads are formed inside the spindle tube 10 and extend toward grooves 33 to connect the spindle tube 10 to the bolt 13 via the first decoupling element 11. In the preferred embodiment form, the first decoupling element 11 is vulcanized on the shank 12 of the bolt 13. However, it is also possible for the first decoupling element 11 to be slid over the bolt 13 as a sleeve. The shank 12 has a first collar 35 at the end facing the threaded spindle 8 and a second collar 36 at the end facing the first fastening element 3.

The end of the spindle tube 10 has an inwardly directed flange 37. In normal operation, there is an axial space 38 between the flange 37 and the second collar 36. In case of incorrect use, for example, when a tensile force acts on the bolt 13 due to the application of a manual force in the opening direction of hatch, the flange 37 serves as a stop for the second collar 36 of the bolt 13 after a deformation path which is defined by the axial distance 38 has been realized in axial direction by the first decoupling element 11. Accordingly, the force is transmitted from the spindle tube 10 directly to the bolt 13 and, therefore, to the first fastening element 3 so that no impermissibly high force is exerted on the first decoupling element 11.

Figure 3:
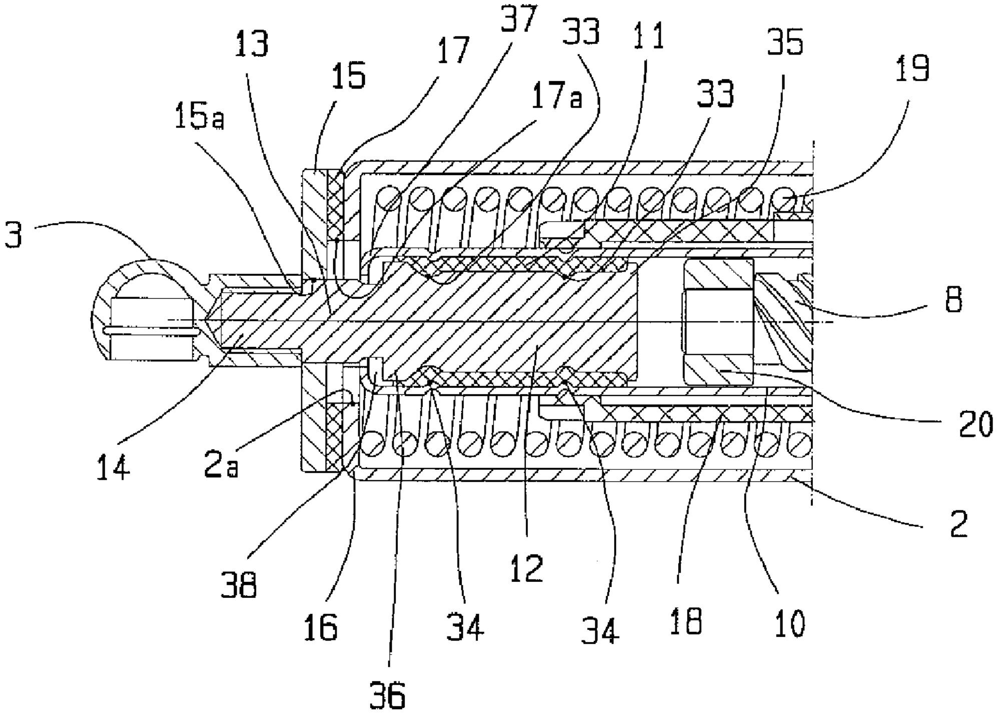
FIG. 3 shows a detailed view of another embodiment form.

In FIG. 3, the opening 2*a* in the outer tube 2 and the opening 17*a* in the second decoupling element 17 have a greater diameter. Further, the diameters of the openings 2*a* and 17*a* are slightly greater than the diameter of the spindle tube 10. Therefore, in case of incorrect use, for example, when a compressive force acts on the bolt 13 due to the application of manual force in closing direction of the vehicle hatch and the bolt 13 has effected a deformation path in axial direction, the supporting ring 15 moves to the flange 37. The force is accordingly transmitted from the spindle tube 10 directly to the bolt 13 and, therefore, to the first fastening element 3 so that no impermissibly high force is exerted on the second decoupling element 17.

In order to further improve the decoupling of the driving device relative to the hatch or body of a vehicle, another decoupling element, not shown, can be arranged at the second fastening element 4. This decoupling element can be constructed similar to the bolt 13 or can be arranged or formed at a spherical pin to which the second fastening element 4 is connected.

The invention is not limited by the embodiments described above which are presented as examples only but can be modified in various ways within the scope of protection defined by the appended patent claims.

We claim:

1. A driving device for a hatch in a motor vehicle, the device comprising:

a first fastening element configured to be connected to a stationary structural component;

a second fastening element configured to be connected to a movable structural component;

a housing tube fixed to the second fastening element and extending toward the first fastening element;

a spindle drive comprising a threaded spindle and a spindle nut, wherein the spindle drive can be driven in rotation to move the first fastening element axially relative to the housing tube; and at least one decoupling element for decoupling the spindle drive from the first fastening element in order to damp noise and vibration.

2. The driving device of claim 1 further comprising:

a spindle tube enclosing the threaded spindle coaxially, the spindle nut being fixed in one end of the spindle tube; and a bolt having a shank, wherein the at least one decoupling element comprises a first elastomeric decoupling element connecting the shank to the other end of the spindle tube.

3. The driving device of claim 2 wherein the shank extends into the other end of the spindle tube, the first elastomeric decoupling element being arranged between the shank and the spindle tube.

4. The driving device of claim 3 wherein the first elastomeric decoupling element is vulcanized on the shank of the bolt.

5. The driving device of claim 3 wherein the first elastomeric decoupling element is a sleeve which is slid over the bolt.

6. The driving device of claim 3 wherein the shank has a plurality of circumferential grooves and the spindle tube has a plurality of circumferential beads which extend toward the grooves to connect the spindle tube to the shank via the first elastomeric decoupling element.

7. The driving device of claim 2 wherein the shank has an end provided with a first collar facing the threaded spindle and an end provided with a second collar facing the first fastening element.

8. The driving device of claim 2 wherein the bolt comprises a threaded pin adjoining the shank, the first fastening element being screwed onto the threaded pin.

9. The driving device of claim 8 further comprising:

an outer tube surrounding the housing tube and having an end with an inward extending flange; and a supporting ring fixed between the first fastening element and the inward extending flange.

10. The driving device of claim 9 wherein the at least one decoupling element comprises a second elastomeric decoupling element arranged between the supporting ring and the inward extending flange.

11. The driving device of claim 10 wherein the second elastomeric decoupling element is constructed as a discrete annular disk.

12. The driving device of claim 10 wherein the second elastomeric decoupling element is vulcanized onto the supporting ring.

13. The driving device of claim 10 wherein the inward extending flange defines a central opening, the bolt extending through the central opening, through the second elastomeric decoupling element, and through the supporting ring.

14. The driving device of claim 13 wherein the inwardly directed flange of the outer tube and the second elastomeric decoupling element each have a central opening with a diameter that is larger than the outer diameter of the spindle tube.

15. The driving device of claim 13 wherein during abnormal operation the supporting ring serves as a stop for the inwardly directed flange of the spindle tube after the inwardly directed flange of the spindle tube passes through the central openings.

16. The driving device of claim 2 wherein the other end of the spindle tube has an inwardly directed flange, the shank having an end provided with a first collar facing the threaded spindle and an end provided with a second collar facing the first fastening element, wherein during normal operation the inwardly directed flange and the second collar are separated by an axial space.

17. The driving device of claim 16 wherein during abnormal operation the inwardly directed flange of the spindle tube serves as a stop for the second collar.

* * * * *